United States Patent [19]

Repik et al.

[11] 4,107,084
[45] Aug. 15, 1978

[54] PROCESS FOR ACTIVATING CARBONACEOUS MATERIAL

[75] Inventors: Albert J. Repik, Charleston; Charles E. Miller, Mt. Pleasant; Homer R. Johnson, Charleston, all of S.C.

[73] Assignee: Westvaco Corporation, New York, N.Y.

[21] Appl. No.: 748,098

[22] Filed: Dec. 6, 1976

Related U.S. Application Data

[63] Continuation-in-part of Ser. No. 585,258, Jun. 9, 1975, abandoned.

[51] Int. Cl.² ..................... C01B 31/10; B01J 21/18
[52] U.S. Cl. ..................................... 252/445; 252/421
[58] Field of Search ............... 252/421, 445; 423/449; 201/31

[56] References Cited

U.S. PATENT DOCUMENTS

| 3,840,476 | 10/1974 | Metrailer ......................... 252/421 |
| 3,843,559 | 10/1974 | Repik et al. ..................... 252/445 |

FOREIGN PATENT DOCUMENTS

| 942,699 | 2/1949 | France ............................. 252/411 R |
| 506,544 | 9/1930 | Fed. Rep. of Germany ........... 252/421 |
| 1,119,238 | 12/1961 | Fed. Rep. of Germany ........... 252/421 |
| 546,531 | 7/1942 | United Kingdom ..................... 252/421 |

Primary Examiner—P. E. Konopka
Attorney, Agent, or Firm—Richard L. Schmalz; Ernest B. Lipscomb, III

[57] ABSTRACT

There is disclosed an improved process for activating carbon in a fluidized bed system which includes continuous activation at a temperature between 1,000° F. and 2,200° F. using a specific composition of fluidizing gases. The thermal energy required to activate the carbon and to maintain the bed temperatures is transferred only in part by the sensible heat of the fluidizing gases. The fluidizing gases contain excess oxygen, which reacts exothermically with the products of the activation reaction and contributes heat necessary to maintain the bed temperatures. The improved process may also entail introducing secondary excess air above the bed to react exothermically with products evolved from the reactions occurring within the bed to provide additional heat to drive the activation reaction.

6 Claims, 2 Drawing Figures

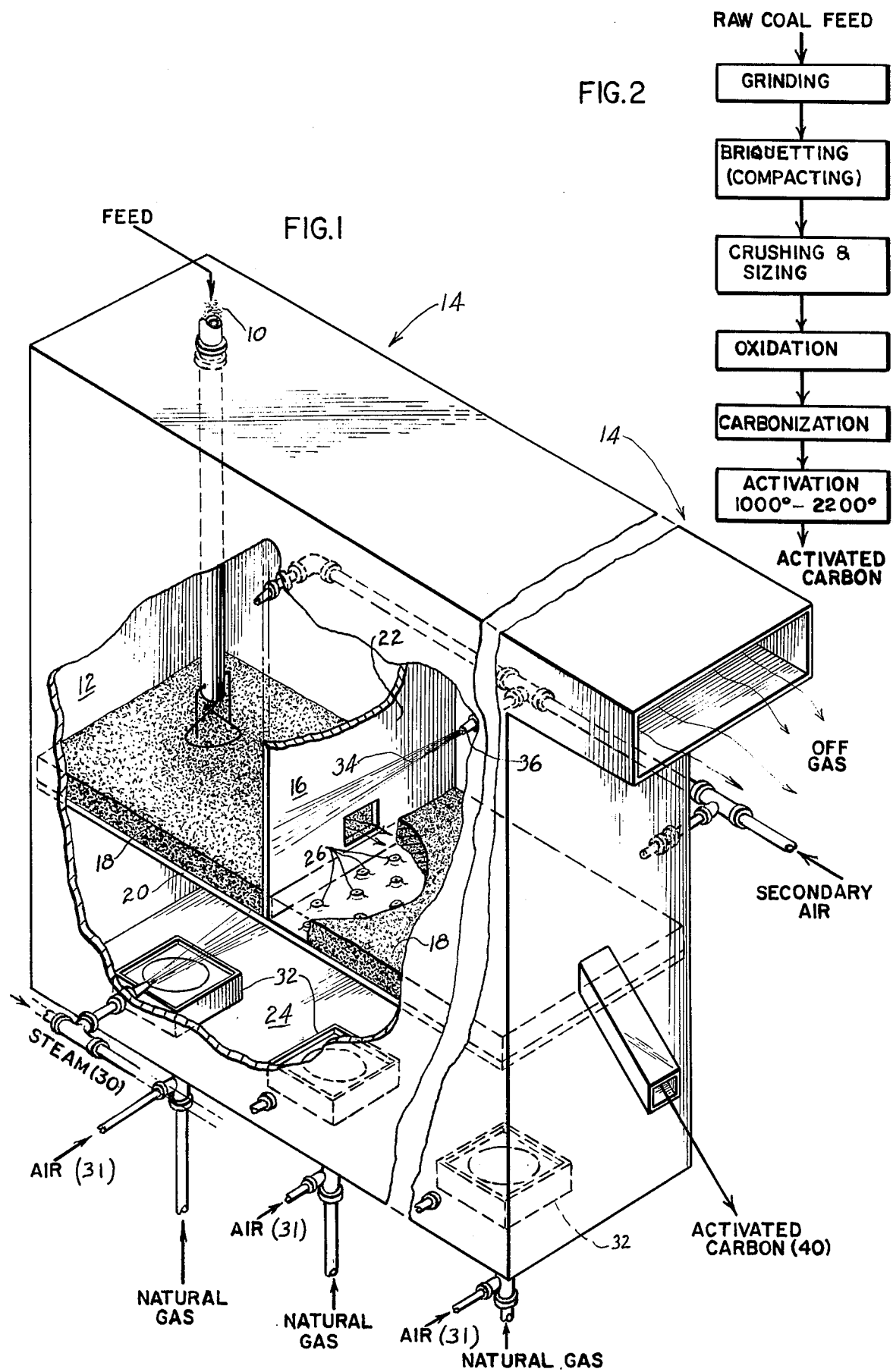

PROCESS FOR ACTIVATING CARBONACEOUS MATERIAL

CROSS-REFERENCE TO RELATED APPLICATION

This application is a continuation-in-part of copending application Ser. No. 585,258 filed June 9, 1975, now abandoned.

BACKGROUND OF THE INVENTION (1) Field of the Invention

This invention relates to an improved method of activating carbonaceous material to maximize the product yield and prevent sintering on the gas distributor plate. More specifically, this invention relates to contacting carbonaceous material, preferably coal, in a plurality of fluidized beds at elevated temperatures whereby at least 10% of the thermal energy of activation is supplied by excess air.

(2) Description of the Prior Art

Sources from which activated carbon is derived include animal materials, such as bone and vegetable matter, such as wood and coconut shells. Activated carbon is also produced from coal. If coal is to be activated in a thermal process to produce granular carbon, the coal is exposed to an oxidizing gas, such as steam, air or carbon dioxide. The oxidizing gases react with the coal and cause an increase in the pore volume and surface area. The desirable properties of activated carbon stem from the increase in pore volume and surface area.

The processing steps for coal taken prior to activation of the carbon can be referred to as pretreatment or preconditioning. U.S. Pat. No. 3,843,559 by Repik et al. describes such pretreatment in detail. This patent is incorporated by reference.

To produce granular activated carbon from coal, three methods have been used. The first and most widely used process involves activation using a multi-hearth furnace. U.S. Pat. No. 3,539,467 to Bozarth et al. describes such activation. An alternative method of activation is a rotary kiln as described in *Activated Carbon* by J. W. Hassler, published by Chemical Publishing, Inc., New York, 1963. The third method of activation involves fluid bed technology, and one such two-step process has been described in U.S. Pat. No. 3,840,476 to W. J. Metrailer.

Briefly, in fluid bed activation, the pretreated feed material is introduced into an enclosed chamber. The chamber is provided with a gas permeable base plate called a distributor plate, through which fluidizing gases are admitted to the chamber from below to contact the bed of carbonaceous material and impart continuous movement to the particles comprising the bed. In this state of rapid continuous movement, the particles are fluid in nature and possess flow properties. Typical fluidizing gases include; (1) a mixture comprising nitrogen, carbon dioxide and steam from the combustion of natural gas with air, (2) a mixture comprised of combustion gases with addition of excess steam and (3) pure steam. At temperatures above 1,000° F., the oxidizing agents within the fluidizing gases can react with carbon to produce an activated carbon product.

Unfortunately, because of various problems, fluid bed technology has heretofore not proved to be an entirely suitable commercial alternative to carbon activation using a multihearth furnace. A serious problem has been ash sintering which results in the formation of ash within the bed and on the plate of a fluid bed activator. Accumulation of sintered ash agglomerates, particularly on the gas distribution plate, could, of course, result in non-uniform gas distribution, lower production rates as the fluidized bed volume decreases from an increasing agglomerate volume, and ultimate shutdown of the equipment for cleaning and maintenance.

Some fluid bed activation methods have circumvented or minimized the potential for ash sintering by controlling both the temperature of the fluidizing gases and of the fluidized bed at about 1,400° F.–1,800° F., well below the sintering range. One such fluid bed activation process was reported by R. Bailey and J. Wilson in "A High Temperature Fluidized Process for the Activation of Anthracite" published in *Journal of Brimingham University Chemical Engineering Society*, 1974. This process is operated in a batch manner, with respect to solids flow, to activate anthracite coal in a single fluidized stage at bed temperature between 1,560° F. and 1,780° F. Steam is supplied at temperatures up to 1,670° F. to serve as the fluidizing gas with gas distribution achieved using a perforated cone arrangement. This steam is also the reactant gas, and heat for the endothermic carbon-steam reaction is supplied by gas burners located in the reactor wall above the bed and discharging their hot combustion products into the bed. It is pointed out that the burners are designed and operated to insure that little free oxygen enters the bed.

In Metrailer, U.S. Pat. No. 3,840,476, the problems of the prior art were handled by development of a two-step fluid bed process wherein coke was first partially activated at low temperatures of from 500° F. to 800° F. followed by further activation at higher temperatures.

A second problem encountered in the development of fluid bed activation of carbon has been backmixing. Backmixing, a characteristic of single-stage fluidized beds, is a term used to indicate that the coal particles do not all remain in the fluid bed for the same period of time. Relatively low fluidizing gas and bed temperatures are utilized in a fluidized bed technique for activation of carbonized material for which J. R. Friday was granted U.S. Pat. No. 3,565,827 in 1971. This patent primarily discloses a means for minimization of particle backmixing which is indicated to be detrimental to product quality and yield.

A batch process for activation of carbonaceous materials using pure steam as the fluidizing gas is disclosed in U.S. Pat. No. 3,677,727 to A. Godel. Godel involves operation with zero fuel requirements with the heat requirements supplied by combustion of the activating off-gases by using at least two reactors which operate in an activating-reheating cyclic manner. While batch activation is occurring in a first reactor, the off-gases are being combusted in a second reactor where the heat is stored.

Relatively high fluidizing gas temperatures are indicated in U.S. Pat. No. 3,852,216 to Ninomiya and Kunii which discloses a fluidized bed process for producing coarse particles of activated carbon. The coarse particles are mixed in the fluidized bed with finely powdered inert material to provide a decrease in the required fluidizing velocity.

Other representative examples of the prior art patents relative to fluid bed and carbon activation or regeneration technology include U.S. Pat. Nos. 3,804,581; 3,756,922; 3,770,369; 3,617,727; 3,565,821; 3,153,633; 2,933,454; 2,851,428; 1,858,745; 1,843,616; British Pat.

Nos. 546,531 and 1,302,456; French Pat. Nos. 942,699 and 951,153; and German Pat. No. 506,544.

BRIEF SUMMARY OF THE INVENTION

An improved process for activating carbon in a plurality of fluidized beds has been found that uses oxygen under conditions to maximize product yield and minimize fuel requirements. Advancing the feed material through a plurality of compartments prevents backmixing. The improved process consumes considerably less fuel than would be expected but not at the expense of carbon yield by using excess oxygen as a component of the fluidizing gases to provide more than 10% of the thermal energy required for activation within the temperature range of 1,000° F.–2,200° F. with a preferred range of 1,700° F.–1,950° F. Once the carbon advances beyond the first compartment to other fluid beds, it is preferred to carry out the process of activation within the preferred range. The process may also include introducing secondary excess air above the fluid bed. The heat transfer mechanism is accomplished in such a manner that sintering and fusion of particles comprising the bed are prevented.

BRIEF DESCRIPTION OF THE DRAWING

FIG. 1 shows a fluidized bed reactor having a portion of its wall cut away for use with the process of this invention.

FIG. 2 is a block diagram illustrating a process for making activated carbon.

DETAILED DESCRIPTION OF THE OPERATION OF THE INVENTION

Quantitatively, the energy required to sustain continuous activation of carbon at high temperatures, i.e., between 1,700° F. and 1,950° F., has been found to be about 25,000–150,000 B.T.U./Hr. per square foot of reactor area using the bed temperature as reference. This amount of thermal energy or heat can be provided by the sensible heat of the fluidizing gases, such as provided in U.S. Pat. No. 3,976,597.

However now, a process has been found which provides the majority of the heat required to drive the activation reaction from a source other than the sensible heat of the fluidizing gases and unexpectedly results in reduced fuel consumption without reducing the carbon yields.

Although in the past it has been the practice to provide the majority of the thermal energy to activate the carbon by means of the sensible heat contained in the fluidizing gas, temperatures of the gas entering the bed and of the plate top surface exceeded the coal ash sintering temperature, 2,000+° F., so that sintering of the ash occurred.

The activation process is carried out by using excess air in the fluidizing gases to react with the products of activation and devolatilization. The use of excess air in this reaction is exothermic. The heat produced by these exothermic reactions is utilized to sustain the activation process. When excess air is used, the total heat input is expressed by equation [1]:

$$Q_T = Q_C + Q_E + Q_S \qquad [1]$$

where:
$Q_T$ = total heat input into the bed, B.T.U./Hr.
$Q_C$ = rate of heat input by conduction through the distributor plate, B.T.U./Hr.
$Q_E$ = rate of heat input resulting from the reaction of oxygen contained in the excess air, B.T.U./Hr.
$Q_S$ = rate of sensible heat input into the bed, B.T.U./Hr.

How the thermal energy, $Q_E$, is generated can be appreciated by considering the following description.

The predominant reaction for activation of carbon particles is the result of the reaction between carbon and steam in the fluidizing gases.

$$C + H_2O \rightarrow CO + H_2 \qquad [A]$$

The reaction [A] is endothermic. The thermal energy required for the reaction to proceed is contained in $Q_T$ of equation [1], and a portion of this heat is obtained by the exothermic reactions of excess air.

There are four exothermic reactions involving the oxygen in the excess air within the fluidized bed.

$$2C + O_2 \rightarrow 2CO \qquad [B]$$

$$C + O_2 \rightarrow CO_2 \qquad [C]$$

$$2 2 + O_2 \rightarrow 2H_2O \qquad [D]$$

$$2CO + O_2 \rightarrow 2CO_2 \qquad [E]$$

The hydrogen and carbon monoxide of reactions [D] and [E] are generated by the activation reaction [A]. The carbon of reactions [B] and [C] is from coal in the particle bed. Reactions [B] and [C] occur primarily on the surface and thus do not produce internal pore volume and increased surface area as the reaction between carbon and steam does. Thus, the reactions of carbon with oxygen cause a deterioration of product yield and quality.

Unexpectedly, it has been discovered that the deterioration of yield and quality caused by reactions [B] and [C] can be essentially eliminated by decreasing the temperature of the fluidizing gas as the amount of excess air is increased. Thus, it was found that more than 10% of the thermal energy required may be supplied by the exothermic reactions involving excess air injected into the fluidizing gases; and in some cases, more than 50% of the thermal energy is supplied.

Control of the fluidizing gas temperature is essential to obtain improved yields, which are necessary to make the process commercially valuable. The ability to control the product yield and quality is the result of several factors which are not fully understood. These factors include, (a) equilibrium considerations dependent on temperature, which result in reaction [B] being predominant at the highest fluidizing gas temperature, (b) reaction [C] becoming predominant over reaction [B] as the fluidizing gas temperature is initially decreased, and (c) finally reactions [D] and [E] becoming predominant over reaction [C] as the fluidizing gas temperature is decreased further.

For the temperature ranges of this process, sources of thermal energy are reactions [D] and [E]. The use of excess air in the fluidizing gases lowers the gas temperature and in combination with particle agitation prevents sintering and formation of coal ash on the gas distributor plate.

Regardless of whether excess air is added to the fluidizing gases, secondary excess air may be introduced above the bed of feed material. During activation, volatile products are evolved. The oxygen in the secondary excess air reacts with some of these volatiles exothermically to provide further thermal energy for the activation process. When secondary excess air is used, the total amount of thermal energy available for the activation process can be represented as:

$$Q_T = Q_C + Q_{SA} + Q_E + Q_S \qquad [2]$$

where:

$Q_{SA}$ = rate of heat input provided by the exothermic reaction of oxygen contained in the secondary excess air, B.T.U./Hr.

DETAILED DESCRIPTION OF THE PREFERRED EMBODIMENT

Referring now to FIG. 1, feed material 10 which is sized and pretreated is introduced into a first compartment 12 of a fluid bed activator 14 having a plurality of compartments or beds. For convenience, FIG. 1 represents only the first and last compartments of an activator. It is to be understood that any number of compartments can be placed side-by-side between the first and last compartments; or in the broadest sense, only one compartment may be used. The intermediate compartments, similar or identical to the first compartment 12 and last compartment 16, communicate to allow continuous advancing fluidized flow of the feed material from compartment to compartment until the material exits the activator by overflowing. The preferred feed material 10 is coal which has been pretreated. Throughout the remainder of this description, the feed material will be referred to as coal, although it is understood that other carbonaceous materials are capable of being activated by the process described herein. FIG. 2 is a flow diagram illustrative of the sizing and pretreatment operations prior to activation. U.S. Pat. No. 3,843,559 by Repik et al. describes these steps taken prior to activation.

The coal particles 10 which are introduced into the first compartment 12 are of a size suitable for fluidizing. In general, the coal particles can have diameters ranging between ¾ inch to 100 mesh. The coal used as the feed material can be either coking or non-coking in nature. It is conceivable that if the coal is a non-coking type and properly sized, it could be introduced directly into the activator. When a coking coal is used, it must be pretreated before feeding it into the activator.

During start up, the continuous introduction of feed material 10, in the form of sized and pretreated coal particles, results in the formation of beds 18. As will be described, gases are distributed throughout beds 18 to impart to the bed a fluid nature. As particles are continuously introduced into the feed end of the activator 14, particles in beds 18 are displaced and flow into adjacent compartments toward compartment 16. Beds 18 of particles are eventually formed and then maintained in each compartment of the activator. Each bed is in a fluid state. During activation, particles flow from compartment to compartment as they are displaced by particles flowing from succeeding compartments which take their place. It is preferred to use a baffle-type construction at the point at which two compartments communicate with one another. Various other structures which function to permit the particles to flow from compartment to compartment while controlling backmixing are also possible.

The floor of each compartment of the fluid bed activator 14 is gas distributor plate 20. The particles accumulate at or near the top surface of gas distributor plate 20 to form the beds. Gas distributor plate 20 is provided with means 26 to allow fluidizing gases to flow from below the plate into each compartment of the activator 14. The gases introduced through gas distributor plate 20 serve to impart motion to the particles 10 forming the beds 18. The fluidizing gases to each compartment are normally of the same gas composition, but the gas composition may be varied if desired. The result is to place the particles in a state of continuous agitation, a fluid state. Combined with the continuous introduction of feed material, the fluid state of the bed permits a flow of the particles comprising the bed from compartment to compartment until they exit the activator 14 as activated carbon 40. The design of the distributor plate 20 is a factor that can prevent stagnation of particles from occurring. That is to say, the means by which the fluidizing gases are introduced into the beds 18 through the plate 20 can influence the degree of agitation of the particles comprising the bed. It has been found preferable to use a distribution plate having nozzles or tuyeres 26 which project slightly above the surface of the plate.

The fluidizing gases enter the particle bed 18 with a velocity sufficient to cause all the particles comprising the bed to be in continuous motion, e.g., in a fluid state. It is important to prevent the presence of stagnant particles especially on the surface of the plate 20.

The usual fluidizing gas is a mixture of combustion gas and an oxidizing gas. The combustion gas is a product of burning a mixture of fuel, such as natural gas, and air. The combustion takes place in a burner 32 located in combustion chamber 24, preferably located below gas distributor plate 20. Steam is the preferred oxidizing gas which is added to the combustion gases to form the mixture which fluidizes the bed. The oxidizing gas is responsible for the activation of the coal (carbon) particles which form the bed. The reaction of steam with carbon increases the pore volume of the particles which results in an increase surface area. The activation process occurs at temperatures above 1,000° F. As shown by FIG. 1, steam is added directly to the combustion chamber under the distributor plate. There the steam mixes with the combustion gas.

The process of this invention uses a fluidizing gas mixture containing excess air 31, as well as, combustion gas and oxidizing gas. By excess air, it is meant air in excess of the amount required for complete combustion of a given quantity of natural gas. When excess air is a component of the fluidizing gases, the oxygen contained therein can combine exothermically with the feed material and the products of the activation reaction. Because the exothermic reaction provides heat to maintain the bed within the preferred range for activation, 1,700° F.-1,950° F., it results that the sensible heat that must be supplied from the fluidizing gases is decreased. Consequently, the temperature of the fluidizing gases can be decreased.

Thus, it was unexpectedly found that when excess air 31 is provided improved yield will result by lowering fluidizing gas temperature. In general, it can be said that as the quantity of excess air is increased the temperature of the fluidizing gas should be decreased.

The improved process of this invention includes as an alternative embodiment the injection of secondary excess air 34 into the compartments. The secondary excess air is injected at a point above the top level of the carbon bed. Means 36 for injecting secondary air are preferably constructed to insure that the secondary air will be evenly distributed about the carbon bed. Any injection of secondary air which results in a concentration of the air in localized areas is to be avoided. The purpose for injecting secondary air above the bed is to react oxygen contained in the secondary air with combustible vapors which are eminating from the carbon bed. Oxygen can react exothermically with these vapors and thus provide radiant thermal energy to maintain the bed temperature in the desired range between 1,700° F. and 1,950° F. This additional thermal energy may result in a decrease in the thermal energy which is required to be transferred to the bed by the fluidizing gases. Once again, if less heat is required to be transferred by means of the fluidizing gases, a lower temperature for the fluidizing gases is required. If desired, secondary air may be injected in one compartment and not injected into others.

The practice of the improved process of this invention is clearly illustrated by the following examples.

EXAMPLE 1

This example illustrates that lowering the inlet gas temperature while adding excess air improves the carbon yield.

Bituminous coal (8 × 30 mesh) was prepared for activation in a multi-compartmented fluid bed reactor similar to that shown in FIG. 1 by pretreating according to U.S. Pat. No. 3,843,559. The fluidizing gases were composed of the products of natural gas combustion, excess steam and excess air. The temperature of the feed compartment was about 1,500° F., and ranged from 1,750° F. to 1,950° F. for the succeeding compartments. The importance of controlling temperature of the fluidizing gases to maximize yield of the product when using excess air to generate heat exothermically is shown in the data given below.

| Operating Conditions | | Product Properties | | | |
|---|---|---|---|---|---|
| Fluid Gas Temp. °F. | Excess Air in Fluid. Gases # O$_2$/# Feed | Molasses Decolorizing Index Number | Iodine Adsorption Number mg/g | App. Density #/ft.$^3$ | *Product Yield % |
| 2,090 | .23 | 9.3 | 1,198 | 29.5 | 25.5 |
| 1,860 | .25 | 7.6 | 1,200 | 29.5 | 31.5 |
| 1,690 | .32 | 8.8 | 1,186 | 30.2 | 34.0 |

Note:
*For comparison, product yields are extrapolated to a constant activity level as indicated by a Molasses Decolorizing Index Number of 9.0.

Unexpectedly, the product yield was increased to 34% by lowering the fluidizing gas temperature at 1,690° F. as compared to a product yield of only 25.5% when the fluidizing gas temperature was at a higher level, 2,090° F. This indicates that the excess air did not react with carbon as might be expected, but instead reacted with the gases of activation and devolatilization. The carbon produced was commercially acceptable and met A.W.-W.A. standards. No sintering was observed during the activation process. The carbon had the properties given in the table.

EXAMPLE 2

The example illustrates the advantage of fuel economy using the process of this invention.

Suitably prepared 8 × 30 mesh bituminous coal was activated in a multi-component reactor. Fuel economy was achieved by using excess air in the fluidizing gases and by injecting secondary air into the space above the fluidized bed zones. The temperature of the feed compartment was 1,500° F.–1,550° F. and ranged from 1,710° F. to 1,950° F. for the other compartments.

| Operating Conditions | | | | Product Properties | | | |
|---|---|---|---|---|---|---|---|
| Fluid Gas Temp. °F. | Excess Air in Fluid. Gases # O$_2$/#Feed | Secondary Air Above Bed # O$_2$/# Feed | Fuel, CF of N.G. /#Product | Molasses Decolor. Index Number | Iodine Adsorp. No. mg/g | App. Den. #/ft.$^3$ | Product Yield % |
| 2,110 | 0.0 | 0.0 | 20.7 | 7.4 | 1,221 | 30.5 | 32.7 |
| 1,690 | 0.32 | 0.34 | 5.6 | 8.8 | 1,186 | 30.2 | 34.7 |

As shown, a reduction in fuel requirements by a factor of about 4, from 20.7 cf/lb. product to 5.6 cf/lb. product, has been achieved while producing commercial activated carbon having properties exceeding A.W.-W.A. specifications. Temperatures of the inlet gas stream as low as 1,330° F. have also been successfully employed with even lower fuel requirements needed. Once again, these benefits were obtained without encountering any problem of sintering.

It should be appreciated that the present invention is not to be construed as being limited by the illustrative embodiments. It is possible to produce still other embodiments without departing from the inventive concepts herein disclosed. Such embodiments are within the ability of those skilled in the art.

What is claimed is:

1. In a process for continuously activating granular carbon in a fluidized bed system at a temperature between 1,000° F. and 2,200° F. within said system, said system being fluidized with a mixture of combustion gas and an oxidizing gas, the improvement in activation which consists essentially of, supplying thermal energy to a plurality of fluidized bed compartments in side by side communication with one another whereby said carbon is continuously advanced from a preceding compartment to a succeeding compartment to maintain the temperature at a constant temperature in each bed by providing sufficient excess air to each bed whereby more than 10% of the thermal energy required for activation is supplied by reaction of the excess air in the fluidizing gases with the gaseous products of activation and devolatilization and maintaining a constant temperature within each bed by lowering the temperature of the fluidizing gases to thereby maximize the yield of the activated carbon.

2. The process of claim 1 wherein the oxidizing gas is steam.

3. The process of claim 1 wherein the temperatures of the beds are between 1,700° F. and 1,950° F.

4. The process of claim 1 further comprising injecting air into at least one of said beds at a point above the top of the bed in an amount sufficient to react with volatile products within the off gas from said bed to provide additional thermal energy for the activation process.

5. The process of claim 3 wherein the temperature of the fluidized gases is maintained substantially below the bed temperature.

6. The process of claim 5 wherein the fluidizing gas temperature is maintained by reducing the ratio of combustion gas to excess air.

* * * * *

UNITED STATES PATENT AND TRADEMARK OFFICE
CERTIFICATE OF CORRECTION

PATENT NO. : 4,107,084
DATED : August 15, 1978
INVENTOR(S) : Albert J. Repik, Charles E. Miller and Homer R. Johnson It is certified that error appears in the above-identified patent and that said Letters Patent are hereby corrected as shown below:

In column 4, line 23, "$22+O_2 \longrightarrow 2H_2O$ [D]" should read --$2H_2+O_2 \longrightarrow 2H_2O$ [D]--.

Signed and Sealed this

Tenth Day of April 1979

[SEAL]

Attest:

RUTH C. MASON
*Attesting Officer*

DONALD W. BANNER
*Commissioner of Patents and Trademarks*